(12) United States Patent
Bollinger et al.

(10) Patent No.: US 7,490,544 B1
(45) Date of Patent: Feb. 17, 2009

(54) TWIN TWINE ARM FOR A BALER

(75) Inventors: Shane A. Bollinger, Leighton, IA (US); Ryan G. Walker, Newton, IA (US)

(73) Assignee: Vermeer Manufacturing Company, Pella, IA (US)

(*) Notice: Subject to any disclaimer, the term of this patent is extended or adjusted under 35 U.S.C. 154(b) by 0 days.

(21) Appl. No.: 11/858,653

(22) Filed: Sep. 20, 2007

(51) Int. Cl.
*B65B 13/18* (2006.01)
*A01D 39/00* (2006.01)

(52) U.S. Cl. .................. 100/5; 100/13; 100/88; 56/341; 53/587

(58) Field of Classification Search .......... 100/5, 100/13, 15, 87, 88; 56/341; 53/118, 211, 53/587
See application file for complete search history.

(56) References Cited

U.S. PATENT DOCUMENTS

| | | | |
|---|---|---|---|
| 4,793,249 A | 12/1988 | Wellman | |
| 5,170,701 A | 12/1992 | Viaud | |
| 5,215,005 A | 6/1993 | Schlotterbeck | |
| 5,388,504 A | 2/1995 | Kluver | |
| 6,209,450 B1 | 4/2001 | Naaktgeboren | |
| 6,446,548 B2 | 9/2002 | Chow | |
| 6,769,353 B1 | 8/2004 | Smith | |
| 2008/0034984 A1* | 2/2008 | Olander et al. .................. 100/4 |

* cited by examiner

*Primary Examiner*—Jimmy T Nguyen
(74) *Attorney, Agent, or Firm*—Sturm & Fix LLP

(57) ABSTRACT

In a round baler, twin arms come together in the start position, on the side opposite the cut position, because that configuration ensures that two twines lie nearly on top of each other to secure the bale much better at that end than with a single twine. The "start position" refers to that position where the twine arms reverse direction, and change from a fast speed of travel used to move the twine arms across the bale width, to a slower, controlled speed that is adjustable to vary the spacing of the twines. The change in direction combined with bringing the twine arms together at the start position, ensures that loose twine ends are effectively restrained as the twines are applied.

1 Claim, 7 Drawing Sheets

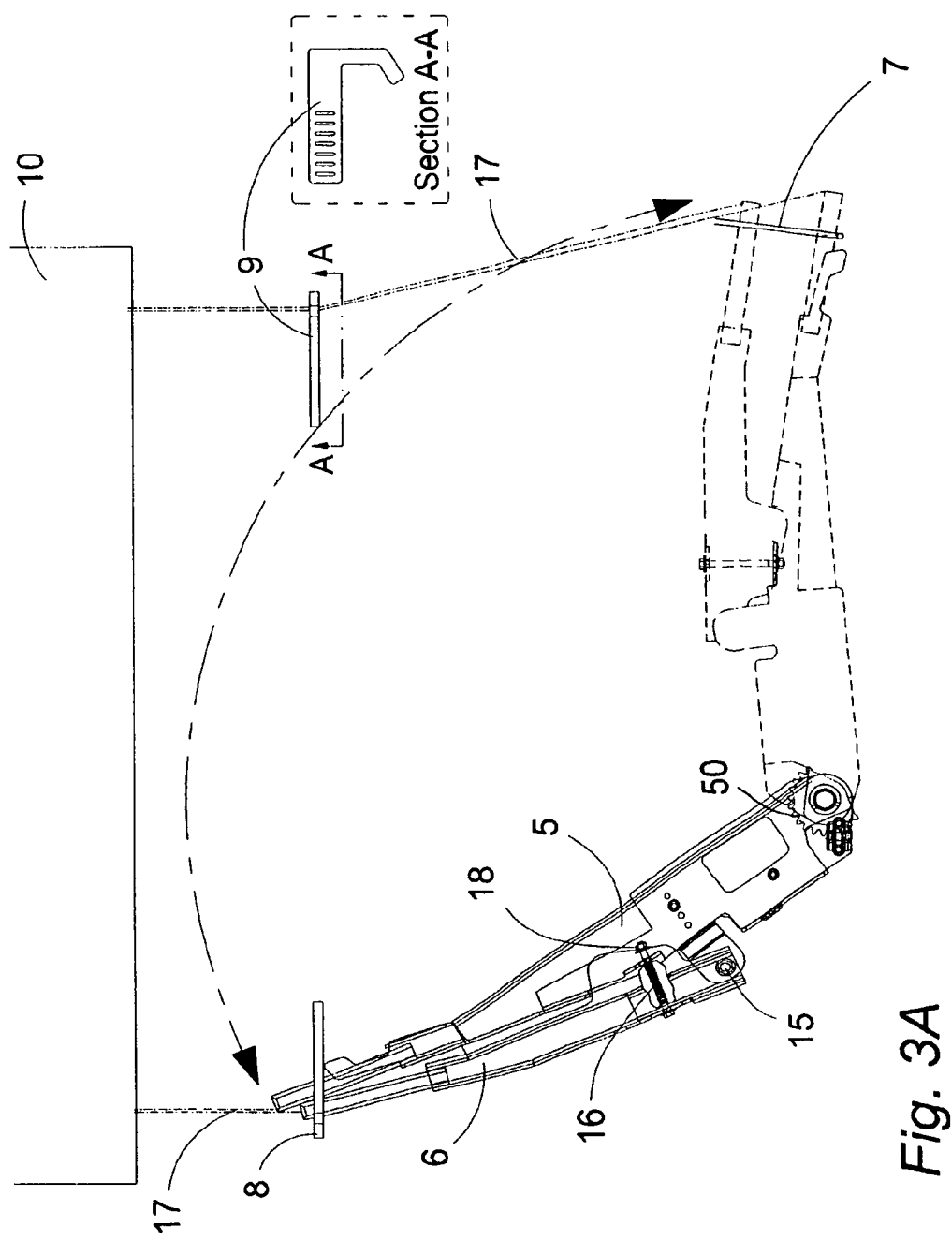

TWIN TWINE ARM FOR A BALER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to a twin twine arm for use in balers and more particularly, to one which bring the twine arms together at the start position to ensure that loose twine ends are effectively restrained as the twines are initially applied.

2. Background Art

| U.S. Pat. No./ Pat. application. # | Title | Date |
|---|---|---|
| 6,769,353 | Four twine tube round baler twine system | Aug. 3, 2004 |
| 6,446,548 | Round baler twine wrap control with automatic restart (2 tubes) | Sep. 10, 2002 |
| 6,209,450 | Round baler with improved twine wrap control (2 tubes) | Apr. 3, 2001 |
| 5,388,504 | Twine wrap control for round baler (2 tubes) | Feb. 14, 1995 |
| 5,215,005 | Telescopic twine arm for round baler twine wrapping apparatus (2 twine arms) | Jun. 1, 1993 |
| 5,170,701 | Twine arm arrangement | Dec. 15, 1992 |
| 4,793,249 | Double twine arm for dispensing twine into a bale chamber | Dec. 27, 1988 |

The patents listed above, all of which are incorporated herein in their entirety, show twin twine arm technology for round balers. A major problem with this prior art technology as clearly reflected in the patents above is the problem of getting the twines to hold at the starting side of a bale. Accordingly there is a need to solve this problem.

BRIEF SUMMARY OF THE INVENTION

It is considered a significant benefit that the twin arms of the present invention come together in the start position, on the side opposite the cut position, because that configuration ensures that two twines lie nearly on top of each other to secure the bale much better at that end than with a single twine. The "start position" refers to that position where the twine arms reverse direction, and change from a fast speed of travel used to move the twine arms across the bale width, to a slower, controlled speed that is adjustable to vary the spacing of the twines. The change in direction combined with bringing the twine arms together at the start position, ensures that loose twine ends are effectively restrained as the twines are applied. The twines typically begin to feed while the twine arms are separated and moving quickly across the bale width.

An object of the present invention is to provide an apparatus to install double twine on the start end of a bale to ensure that loose twine ends are effectively restrained without the need to install double twine over the rest of the bale.

Other objects, advantages and novel features of the present invention will become apparent from the following detailed description of the invention when considered in conjunction with the accompanying drawings.

BRIEF DESCRIPTION OF THE DRAWINGS

FIG. 3 is a top view of the twine arm at the start position in solid lines and showing how it pivots about an axis in an arc of more than 90 degrees to an extreme other side position shown in dashed lines;

DETAILED DESCRIPTION OF THE INVENTION

Figure 1A:
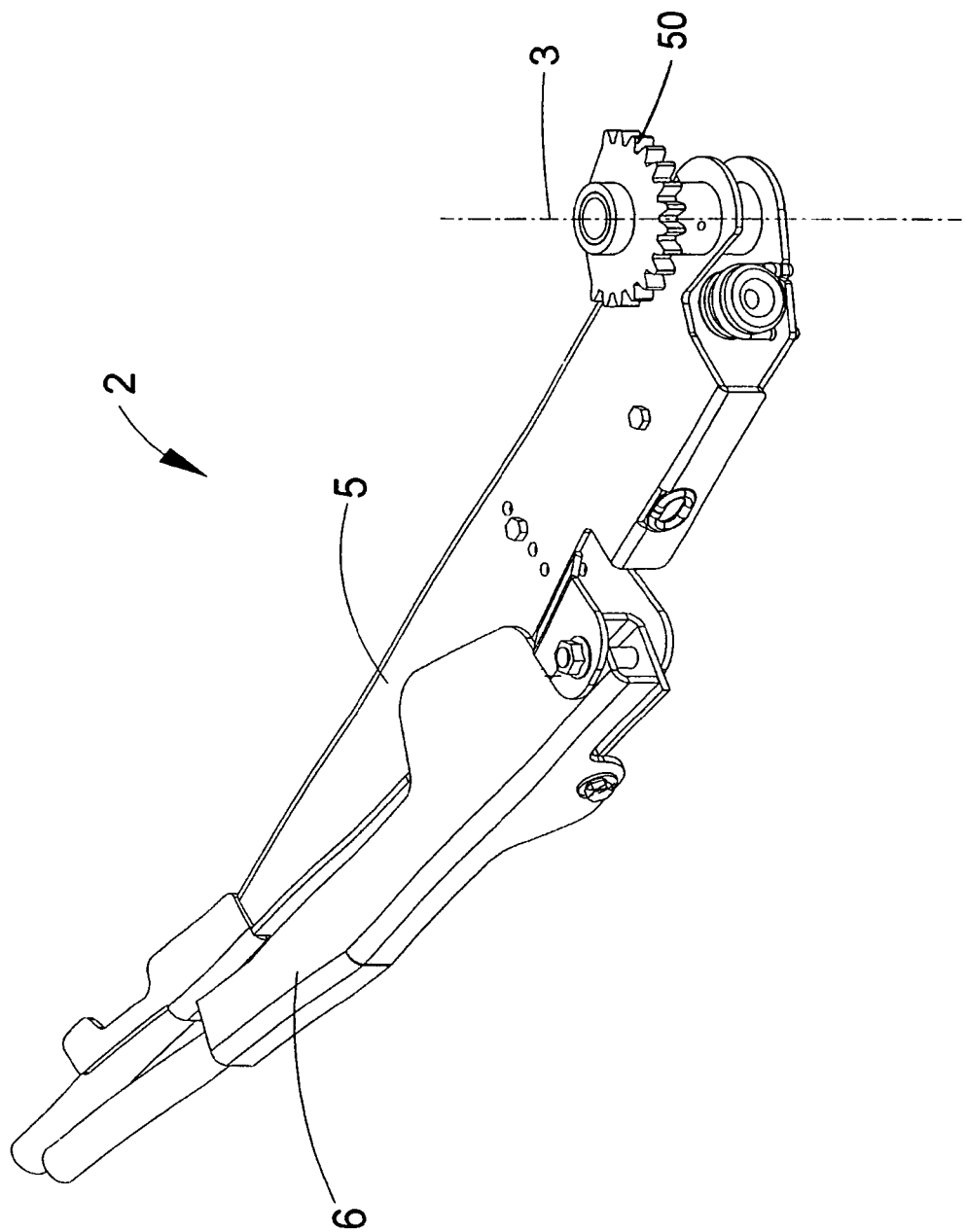
FIG. 1A is an isometric view of a twin twine arm constructed in accordance with the present invention that has a fixed connection and a spring connecting and biasing two arms apart though they are shown compressed together in FIG. 1A.
Figure 1B:
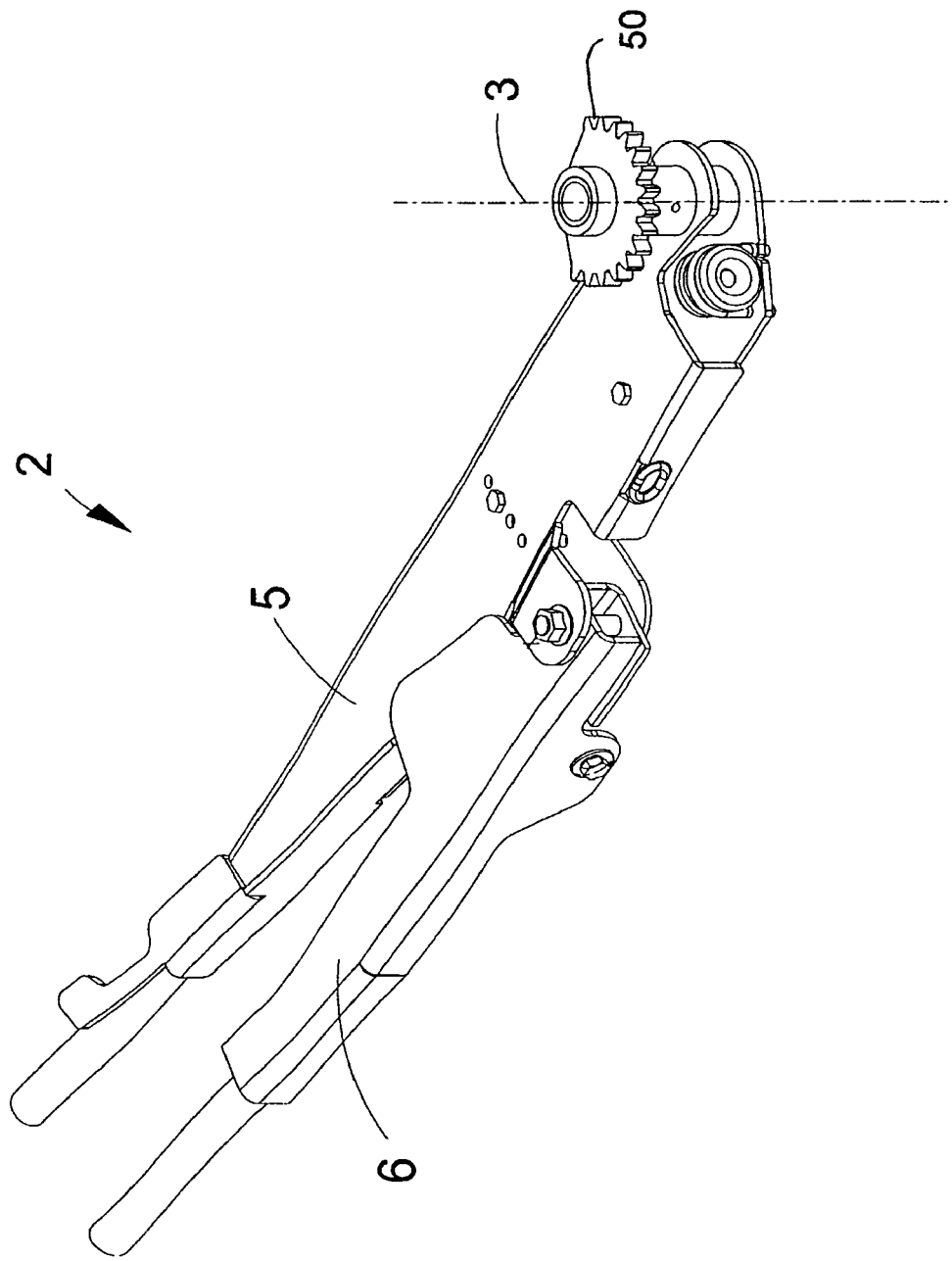
FIG. 1B is an isometric view of the twin twine arm with the fixed connection and spring connected arms separated by a preset distance for wrapping twine across the bale during arm travel except at or near the start position thereof.
Figure 2A:
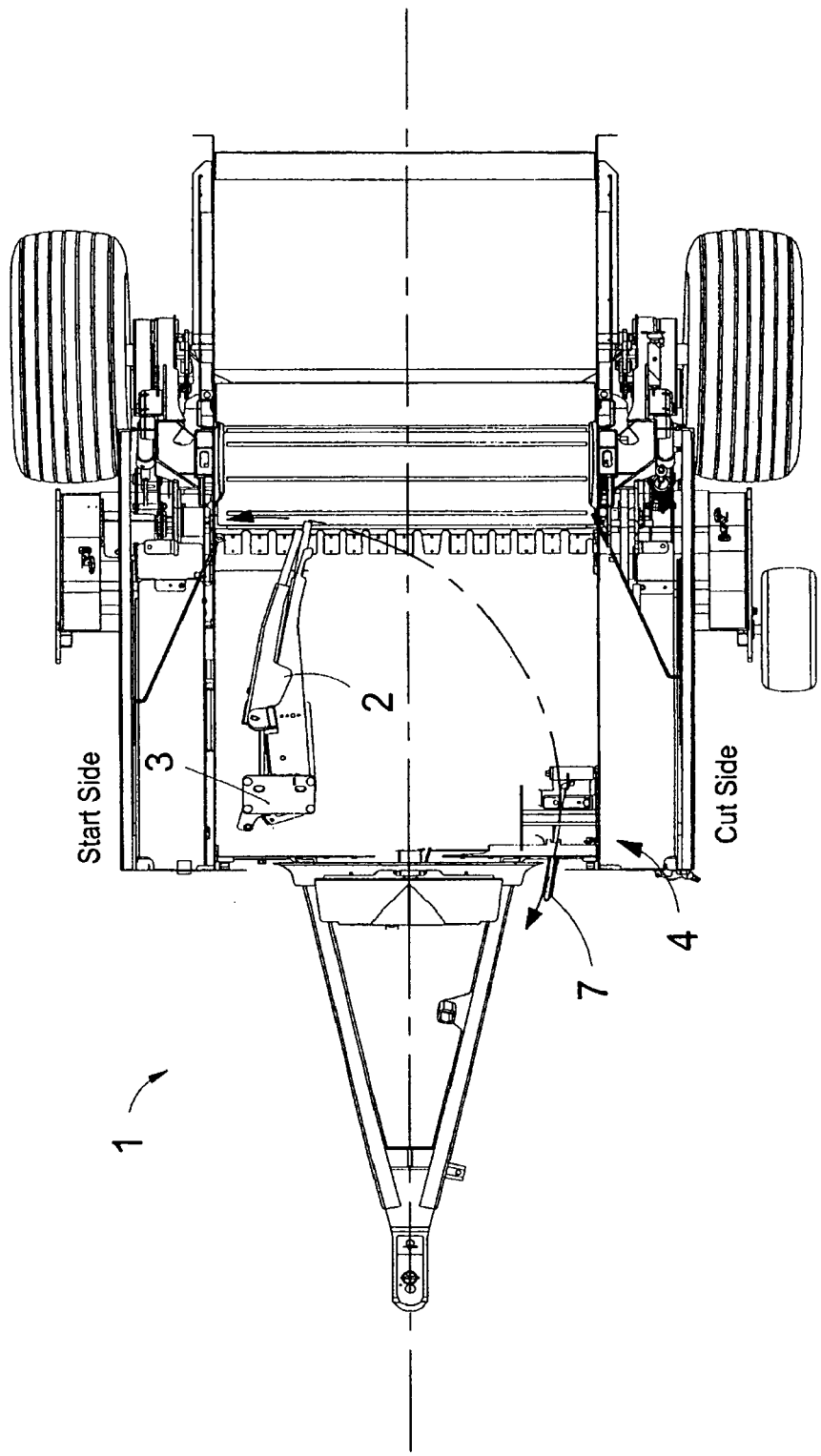
FIG. 2A is a simplified top view of a baler having the twin twine arm system with an axis of rotation located opposite the cut side, the twine arm being shown closed on the start side of the machine.
Figure 2B:
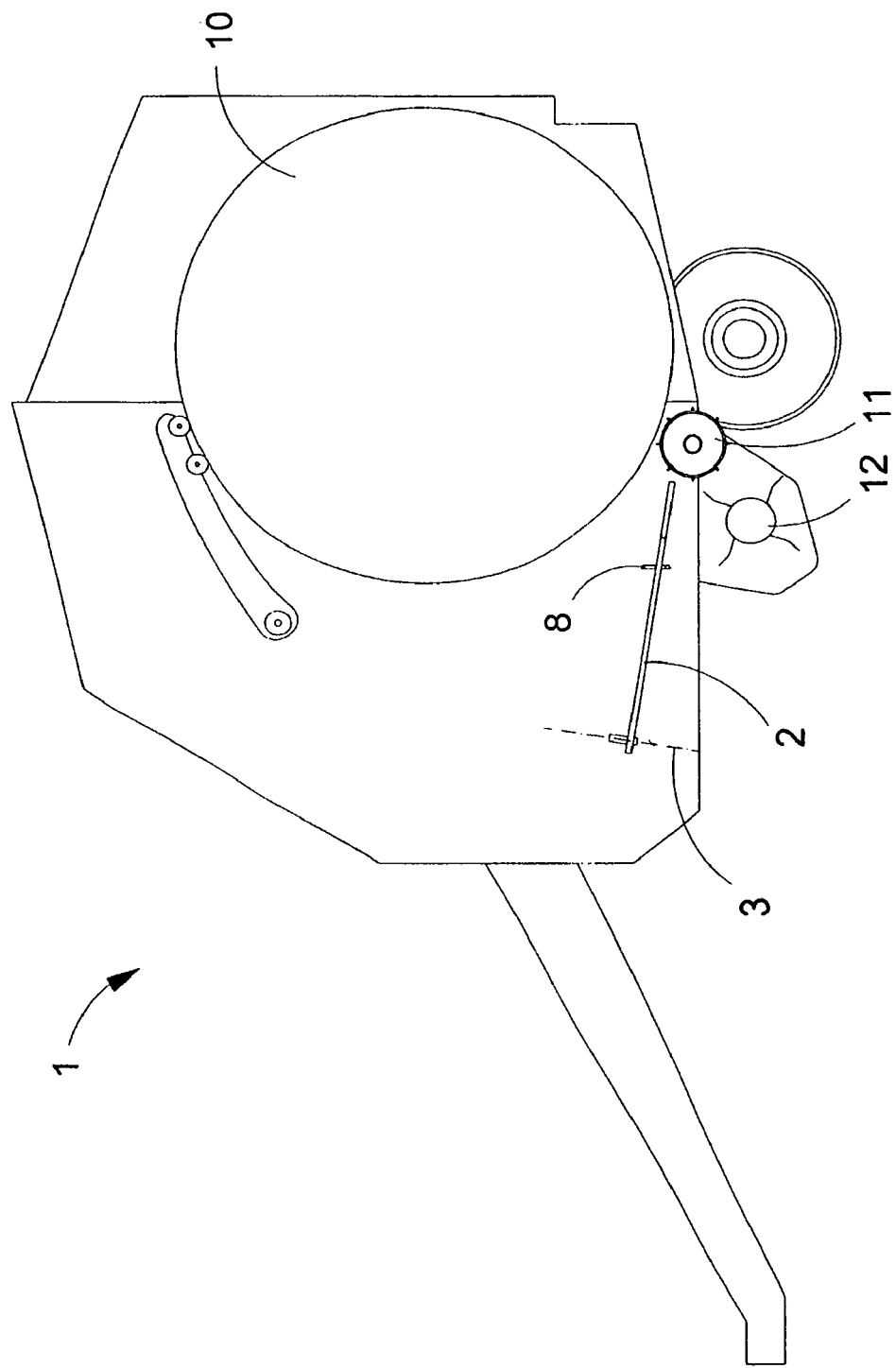
FIG. 2B is a simplified side section-view of a baler having the twin twine arm system arranged as it is when twine begins to be taken up by a bale, and showing in dashed lines how far up or down the twine arm system can be moveable.

Referring now to the drawings wherein like reference numerals correspond to the same or similar parts throughout the drawings, FIGS. 2A and 2B show a baler 1 with a twin arm 2 pivotally attached around point 3 on the baler 1. Well known baler components shown also in FIG. 2B include a feed roller 11, and a pick up unit 12.

Figure 3B:
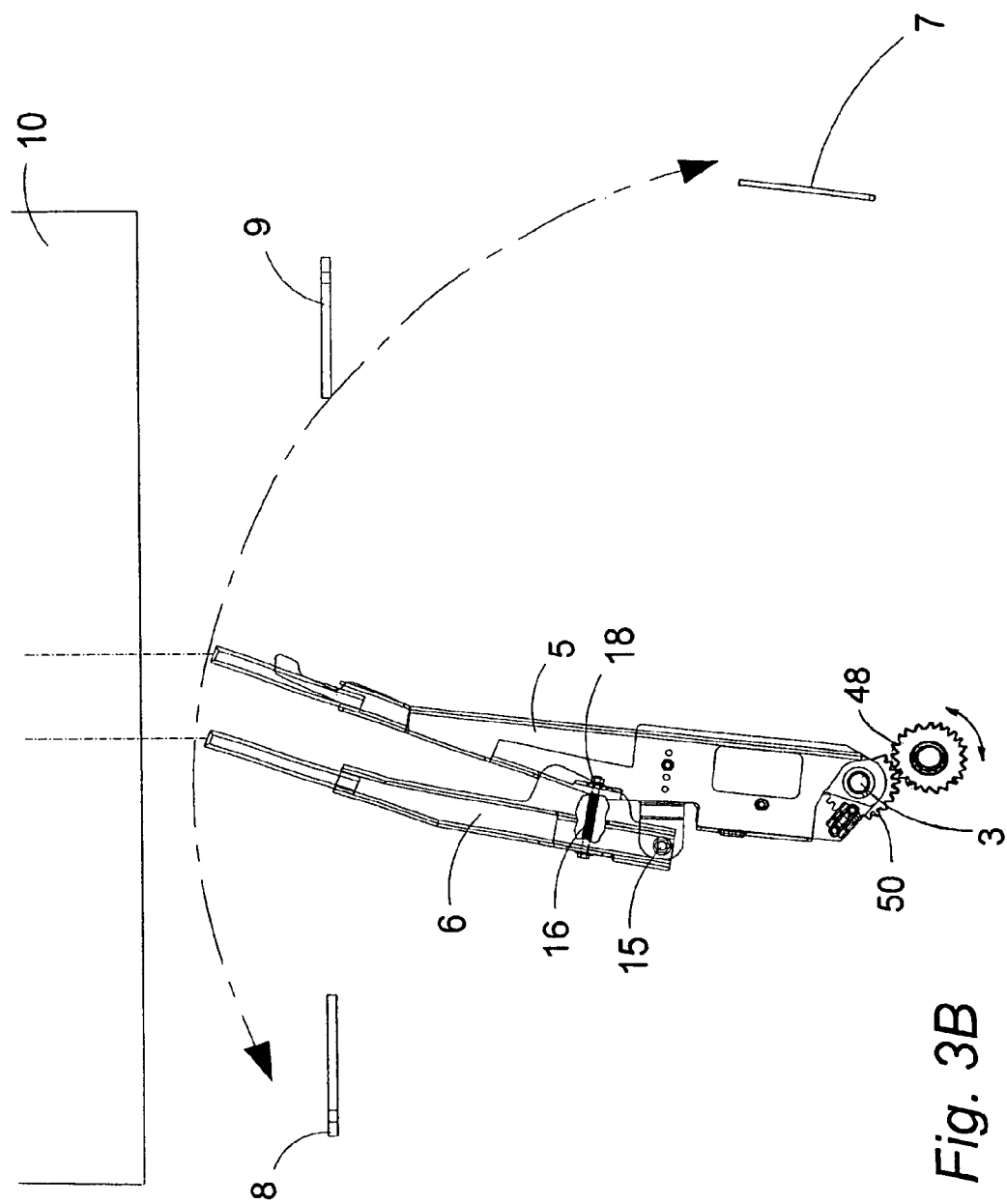
FIG. 3B is a top view of the twine arm pivoted somewhat from the start position in solid lines and as it pivots in an arc, shown in dashed lines, noting that the secondary arm has pivoted away from the main arm to apply the twines in a more spaced apart fashion.
Figure 3C:
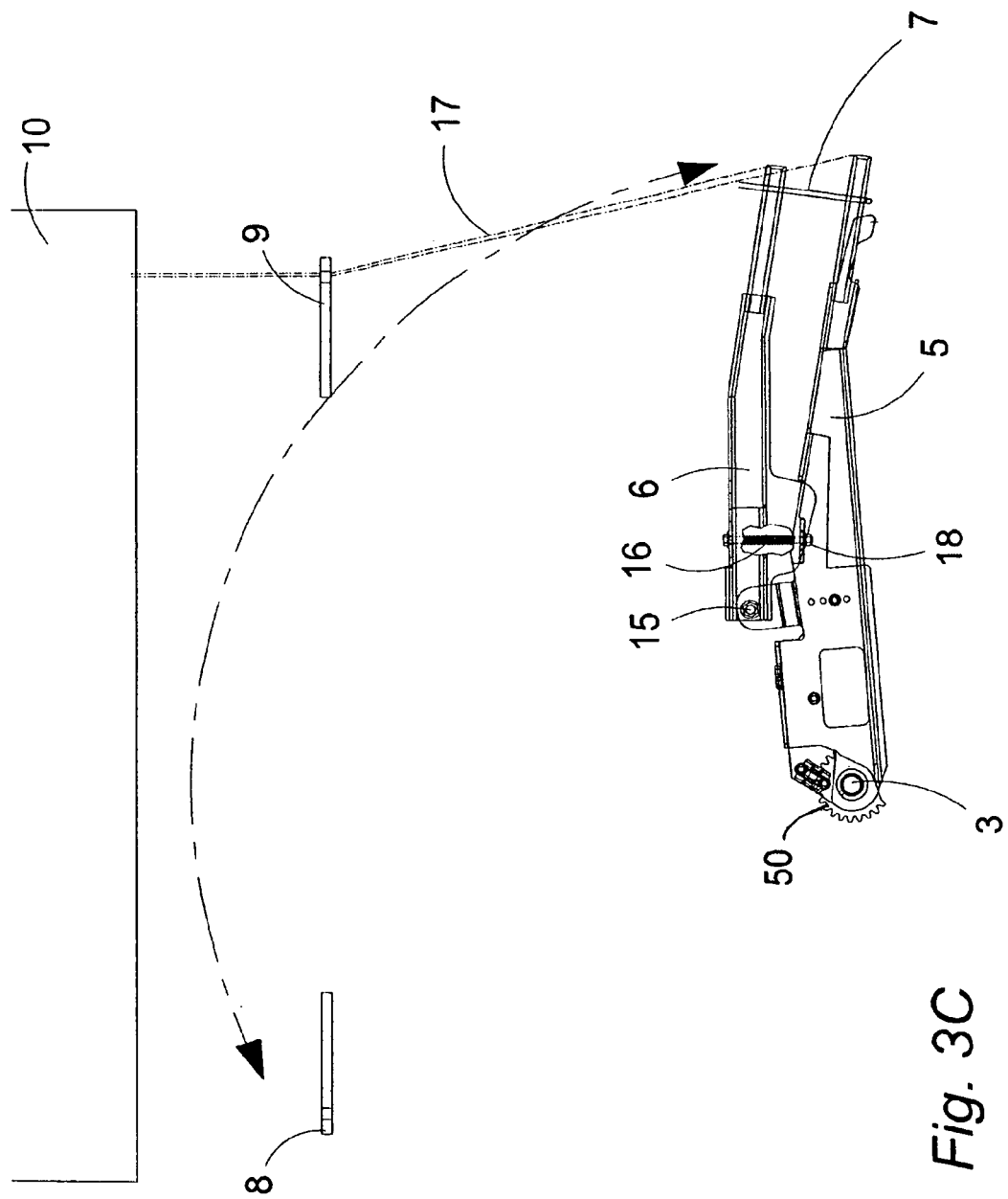
FIG. 3C is a top view of the twine arm pivoted to the position in solid lines to the extreme opposite side position from the start position, noting that the secondary arm is still pivoted away from the main arm but that the twine twines are applied to the bale close together again along the ending end of the bale.

In the preferred embodiment shown, twin arms 2 having twine guide tubes 5, 6 at their outer end are attached and pivot around a point 3 located off-center of the bale away from the twine-cut side of the machine 1. Twine application generally works better the closer the tubes are to the bale so this embodiment allows better wrapping on the start side where the off-center pivot 3 allows the tubes to be closer to the bale. The rotation of the twine arms is actuated by a cylinder attached to the twine arm system 2. The attachment of the two arms 5 and 6 is such that the spring-connected arm 6 pivots at a point 15 on the fixed-connected arm 5. The two arms 2 are fastened in a secondary location with an adjustable length spring device 16 so as to allow the operator to set the distance between twines to be applied to the bale 10 yet also allow the two arms 2 to collapse together as the spring 16 experiences compression. FIGS. 3A, 3B and 3C show a gear 50 which meshes with gear 48, as shown in FIG. 3B, and comprises a reversible drive coupled to said first twine arm for oscillating the first twine arm between said first and second locations.

During baling operation, the arms 2 are stowed in the extreme cut-position shown in FIG. 3C, which means that the arms 2 in the position to the right as shown in FIG. 3C are adjacent to the twine cutter 4 shown on the right side of FIG. 2A. In this position, the twine ends have been cut and hang freely. An automatic twine wrapping cycle includes the following:

The twin twine arm apparatus 2 begins to rotate toward the bale 10 at a speed which will be referred to as "high speed." Referring to FIGS. 3A, 3B and 3C, this rotation occurs, the spring-connected arm 6 leads in front of the fixed-connected arm 5.

Due to the rotating action, the arm ends come into close proximity with the bale 10 near the midpoint of the bale. At some point, the turning bale 10 will begin taking up the twines 17 as the arms 2 continue to rotate about their pivot 3 to the side of the machine opposite the cut-side to an extreme position shown in solid lines FIG. 3A, called the start position.

When the spring connected arm 6 makes contact with a position-adjustable finger 8 mounted on the machine, further rotation causes the spring 16 to be compressed and the two twine arms 2 to be forced together. This causes the benefit of having two twines lying on top of each other on the start end of the bale 10 ensuring a good wrap. The twine arms 2 remain collapsed together for a determined adjustable time in the start position such that plenty of twine is applied to the bale 10. The pivoting distance between arms 5 and 6 can be adjusted by threaded fastener 18.

Rotation of the twine arms 2 resumes in the opposite direction at a speed which will be referred to as "slow speed". The directional change results in the arms 2 being spread apart to the preset angle by the released spring 16.

The twines are wrapped around the bale 10 at a width defined by the angle between the two arms and advance across the bale as the slow rotation towards the cut position continues.

The twines are caught by a position adjustable finger 9 which limits the twines 17 from wrapping to the end of the bale 10 where they would fall off the bale. This also causes the twines 17 to lie near each other on the bale 10 to get a good wrap on that side of the bale.

The rotation ends when the fixed arm 5 pulls on a mechanical device 7 which stops the rotation or pivoting of the arm 5 as well as providing the force needed for cutting the twines 17 free of the bale 10.

The twines are held on the bale 10 by being interwoven together.

The primary benefit of the present invention is that the twine 17 is assured to wrap better on the start side of the bale shown in solid lines in FIG. 3A by forcing the twines to lie on top of each other while at the same time providing a method for controlling the space between twines 17 to be applied to the bale.

The above embodiment is the preferred embodiment, but this invention is not limited thereto. It is, therefore, apparent that many modifications and variations of the present invention are possible in light of the above teachings. For example, instead of using a spring 16 and stop 8 to cause pivoting 7 arm 6 with respect to arm 5, as shown between FIGS. 3A and 3B, timing gears could be used to cause this relative movement. It is, therefore, to be understood that within the scope of the appended claims, the invention may be practiced otherwise than as specifically described.

The invention claimed is:

1. A baler including a baling chamber having transversely spaced first and second sides and a double twines arm assembly for dispensing twine for wrapping a large cylindrical bale located within the bale chamber, said twine arm assembly comprising:

a first twine arm including a first twine dispensing end being pivotally mounted for oscillation about an axis to sweep a path between first and second locations respectively disposing the first twine dispensing end thereof adjacent the first and second sides of the chamber for wrapping the twine on a bale being formed in the baling chamber, the bale having a width extending from the first side to the second side of the chamber;

a second twine arm pivotally attached to the first twine arm including a second twine dispensing end and being mounted for oscillating in a path at least adjacent to the path swept by the first twine arm;

a reversible drive coupled to said first twine arm for oscillating the first twine arm between said first and second locations;

a spring, having a biasing force, operatively attached to the first and second twine arms for biasing the second twine dispensing end of the second twine arm to a first position away from the first twine dispensing end and permitting the second arm to pivot to a second position wherein the second twine dispensing end of the second twine arm is closer to the first end of the first twine dispensing end than in the first position thereof;

a stop operatively attached to and located at a place on the baler for engaging the second twine arm to stop the second twine arm from moving toward the first location while the first twine arm continues to move toward the first location, thereby moving the second twine arm end to move closer to the first twine dispensing end in opposition to the biasing force of the spring; and the baling chamber has a twine starting side on the first side of the chamber and a twine cutting side on the second side of the bale chamber and the stop is located adjacent the starting side, a first distance between the first twine dispensing end of the first twine arm and the second twine dispensing end of the second twine arm when the first and second twine arms are at the twine starting side is significantly less than a second distance between the first twine dispensing end of the first twine arm and the second twine dispensing end of the second twine arm when the first and second arms are at the twine cutting side of the chamber, a position adjustable finger on the twine cutting side of the bale chamber for engaging the twines to limit the twines from wrapping to the end of the bale.

* * * * *